Jan. 14, 1930. T. F. BURKE 1,743,523
CONTROLLING APPARATUS FOR ELECTRIC MOTORS
Filed Feb. 2, 1923   2 Sheets-Sheet 1
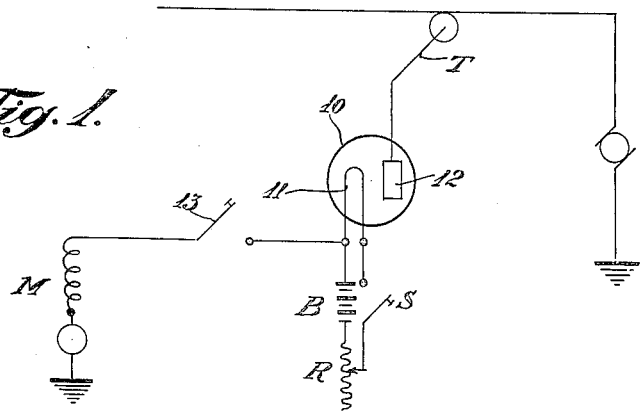
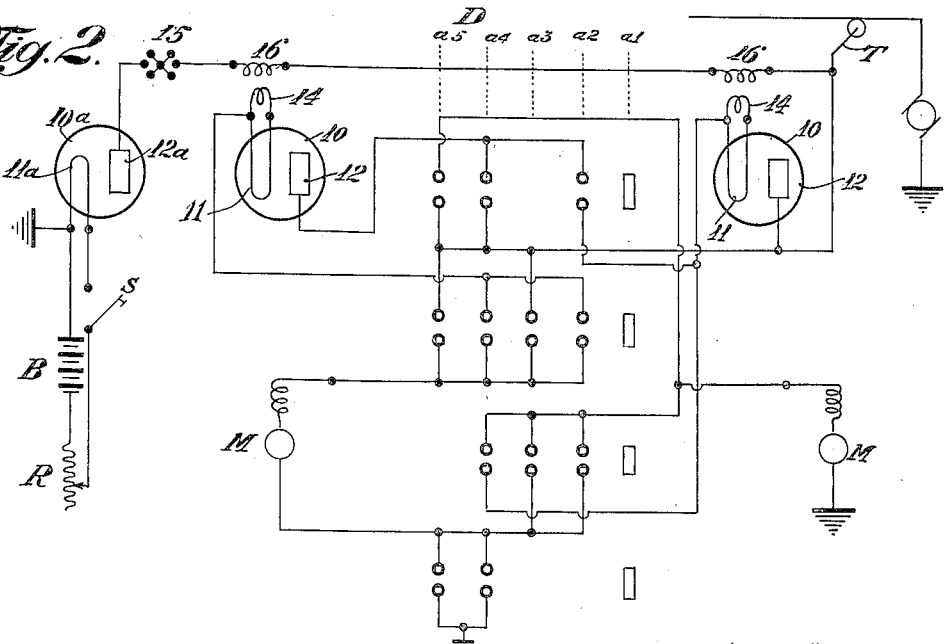
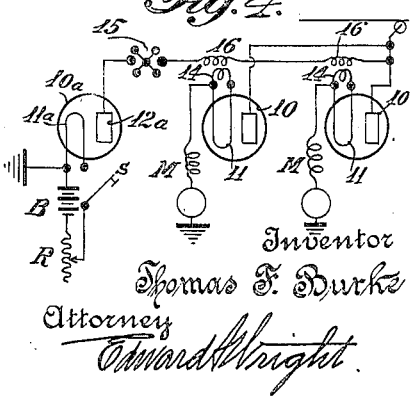
Inventor
Thomas F. Burke
By Attorney
Edward H. Wright Jan. 14, 1930.   T. F. BURKE   1,743,523
CONTROLLING APPARATUS FOR ELECTRIC MOTORS
Filed Feb. 2, 1923   2 Sheets-Sheet 2
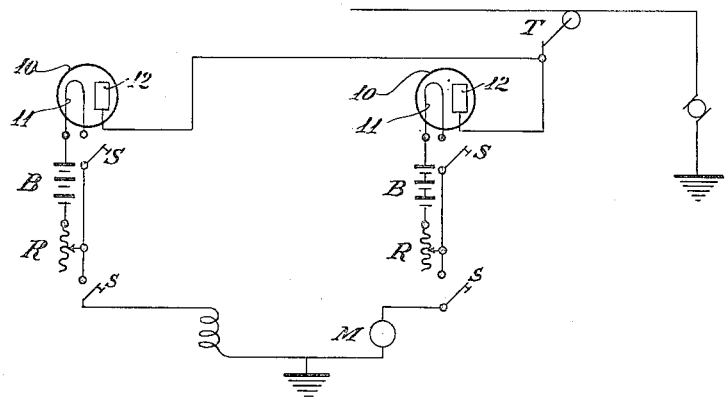
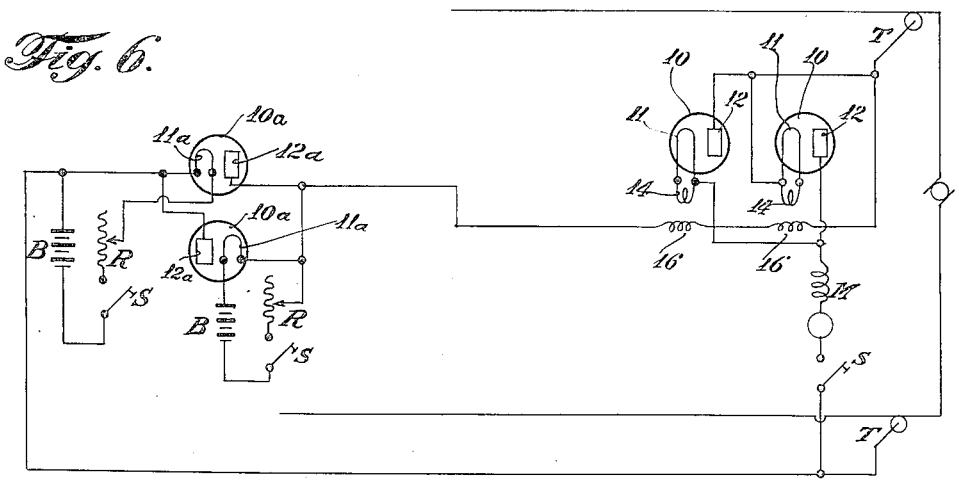
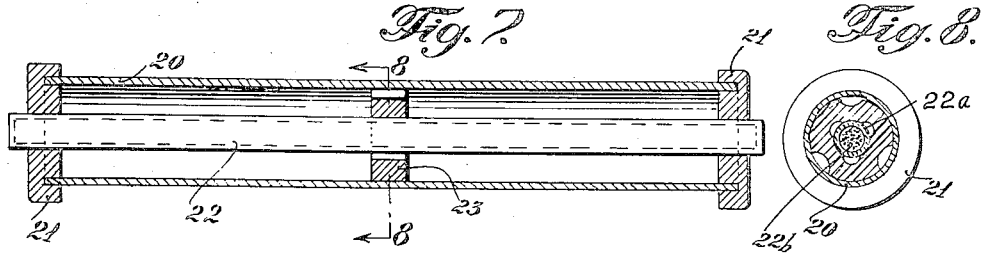
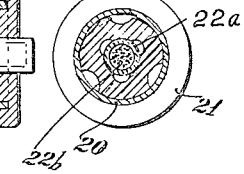
Inventor
Thomas F. Burke
By Attorney
Edward H. Wright.

Patented Jan. 14, 1930

1,743,523

UNITED STATES PATENT OFFICE

THOMAS F. BURKE, OF BROOKLYN, NEW YORK

CONTROLLING APPARATUS FOR ELECTRIC MOTORS

Application filed February 2, 1923. Serial No. 616,458.

This invention relates to means for controlling the starting and running of electric motors, particularly motors of electric railway cars, and has for one of its objects to automatically regulate the amount of current so as to provide a substantially uniform motor torque during starting, and independent of the speed of the motor up to a certain predetermined rate. This may be obtained by the use of one or more suitable thermionic tubes placed in series with the motor, and adjusting the temperature of the filament of the tube to give a limiting current equal to the desired motor current.

According to another feature of my invention, where two or more motors or sets of motors are arranged in parallel upon the same car or train, the motor current in all motors is maintained at the desired amount regardless of the variation in the diameter of the wheels.

Still another feature of my invention comprises an improved form of thermionic tube particularly adapted for use in connection with the circuits of railway motors.

In the accompanying drawings: Figure 1 is a diagram of circuits embodying my improvements as applied to a single electric motor; Fig. 2, a diagram of circuits for two motors and switch means for connecting up the motors either in series or in parallel; Fig. 3, a diagram of the circuits with the switch in the series position; Fig. 4, a diagram of the circuits with the switch in the parallel position; Fig. 5, a diagram of circuits for a shunt wound motor with tubes respectively in series with the field and the armature; Fig. 6, a diagram of circuits with tubes as applied to a motor where the source of power is alternating current; Fig. 7, a longitudinal section of one form of thermionic tube constructed in accordance with my improvement; and, Fig. 8, a transverse section taken on the line 8—8 of Fig. 7.

In a thermionic tube enclosing a filament and a plate in a vacuum, if the plate is electrically charged positive relative to the filament, electrons are thrown off from the filament to the plate, causing an electric current to flow from the plate through the vacuous space to the filament. The strength of the current is a function of the difference in potential between the plate and the filament, increasing with an increase in difference in potential until a certain limiting current is reached beyond which there is substantially no further increase in current. The amount of this limiting current depends upon the design of the tube and upon the temperature of the filament, increasing with an increase in temperature. Thus for any given tube the limiting current may be controlled by regulating the temperature of the filament.

According to my invention, the tube is placed in series with the motor and the temperature of the filament is regulated by a proper adjustment to give a limiting current equal to the desired motor current. In this manner the motor current is held constant until the motor has attained a speed such that the impressed voltage less the sum of the internal resistance drop and the counter E. M. F. of the motor equals the minimum voltage that will cause the limiting current to flow through the tube. Beyond this point the motor current decreases, but at different rates, depending upon the character of the motor and the design of tube employed. Referring to the drawings, I have shown, in Fig. 1, a simple application of my improvement, in which a thermionic vacuum tube, 10, having a filament, 11, and a plate, 12, is connected in the supply circuit from T, to the motor, M. In this instance, the supply is direct current, and connected to the plate, 12, of the tube, while the filament, 11, is connected to the field of the series motor, M. There is also a filament circuit including the battery, B, adjustable resistance, R, and switch, S.

The temperature of the filament is regulated by adjusting the resistance, R, in the circuit from the battery, B when the switch, S, is closed, and the limiting current of the tube is thereby controlled. As direct current is supplied from the source, T, to the plate, 12, this is made positive to the filament which is negative, and when the switch, 13, is closed for supplying current to the motor, the current flows through the tube from the plate to the filament, and to the motor for driving the same.

In Fig. 2, I have shown circuits for a two motor equipment with switch means for connecting the same in series or in parallel. In each case the thermionic tubes, 10, are connected between the motors, M, M, and the source of supply or trolley, T, thereby protecting the motors against damage from violent fluctuations of voltage caused by lightning or other excessive changes. The controlling switch means, D, is shown as having five positions, indicated by the dotted lines at $a^1$, $a^2$, $a^3$, $a^4$, and $a^5$. The first is the open position. In the second position, the motors are connected up in series with the tubes also in series between the source of supply and the motors, as indicated in the diagram, Fig. 3. In the third position, the tubes are cut out leaving the motors in series direct with trolley or current source. In the fourth position, the motors are connected in parallel, with the tubes in series with the respective motors, as indicated in the diagram, Fig. 4. In the fifth position, the tubes are cut out leaving the motors in parallel. When the motors are connected in parallel with the tubes, as indicated in Fig. 4, the tubes prevent an unequal distribution of the load due to a difference in the diameters of different sets of car wheels. For example, in a car or system having relatively differing sizes or diameters of driving wheels, a motor driven from the axle of the wheels of smaller diameter will rotate more rapidly than a motor driven from the axle of the wheels of larger diameter. The building up of counter E. M. F. is a function of the motor speed, and as the counter E. M. F. builds up the current required decreases. Consequently, where motors are associated in a car or system employing wheels which differ in diameter, there will result an unequal distribution of the load to the motors. The thermionic tube connected and associated in the circuits of such associated motors, in accordance with my invention equalizes the current delivery to both motors independently of the speeds of the motors and hence independently of the counter E. M. F. developed therein.

In the diagrams, Figs. 2, 3, and 4, I have also shown a modification in the method of regulating or adjusting the temperature of the filaments, 11, of the tubes, 10. According to this arrangement, the circuit of each filament contains a secondary coil, 14, which cooperates with a primary coil, 16, located in a direct lead from the trolley, T, to another or secondary thermionic tube, $10^a$, having a similar plate, $12^a$, and filament, $11^a$, with a battery, B, adjustable resistance, R, and switch, S, for adjusting the temperature of the filament. The variation of the current through the primary coils, 16, is obtained by means of a constant speed interrupter, 15. As the current flows through the primary coils, and the interrupter to the plate, $12^a$, of the governing tube, $10^a$, thence to the filament, $11^a$, and to the ground, a substantially constant current, independent of fluctuations in the line voltage, is maintained which produces the desired amount of current in the secondary coils, 14, and a coresponding temperature of the filaments in the tubes, 10.

While my invention is particularly adapted for series motors, such as used in railway service, it may also be used with other designs of motors, such as shunt wound motors, as shown in Fig. 5, in which the tubes, 10, are respectively connected in series with the field and the armature of the motor to control the currents through the same.

My invention may also be applied in connection with a motor operated by an alternating current supply, as indicated in Fig. 6, in which the tubes, 10, are used in pairs reversely connected in parallel with each other, and in series with the motor. In this instance, the secondary tubes, $10^a$, for the primary heating circuit, are also arranged in pairs reversely connected as indicated. Where the source of power is alternating current, a constant speed interrupter, such as shown at 15 in Figs. 2, 3 and 4, in the primary coil circuit, is not required.

Another feature of my invention comprises a particular form of thermionic tube, such as shown in Figs. 7 and 8, in which the body is formed of a tubular casing, 20, of suitable material, preferably metal, supported at its ends in the discs or heads, 21, of insulating material. This metal tube forms the plate element of the thermionic tube, while the filament member, 22, extends through the centre of the tube, being supported at its ends in the insulating discs, 21. The tube is exhausted of air in order to produce a vacuum within the same, and between the outer plate or casing and the central filament. The filament is preferably formed of composite electrodes, such as a tube, $22^a$, of tungsten or other suitable material filled with a material, $22^b$, of low resistance and a high melting point, such as carbon or graphite. One or more spacing insulation supports, such as 23, may be employed for holding the filament central within the shell or casing, 20. On account of its tubular shape, the tube has great strength and durability, and in order to aid in the radiation of heat, the outside of the casing may be formed with ribs and of a dull black color. The interior surface of the plate or casing may be highly polished to reflect heat back to the filament. The composite filament requires less diameter and weight than a solid metal filament of the same electrical resistance, and the carbon being of very low resistance, reduces to a minimum the heating effect due to the motor current.

One of the advantages of my invention is that a substantially uniform motor torque is produced during starting independent of the motor speed up to the point where the motor current begins to decrease. For electric railways, this produces a higher rate of acceleration without slipping the wheels, than is the case with the present standard equipment, and a greater efficiency is also obtained without being dangerous or objectionable to passengers.

Having now described my invention, what I claim as new and desire to secure by Letters Patent is:

1. The combination with an electric motor and a source of power, of a thermionic tube containing a filament and plate, the tube being so connected in circuit with the motor as to make the plate positive relative to the filament, a secondary coil in the filament circuit, a primary coil, and a secondary thermionic tube in circuit with the primary coil.

2. The combination with an electric motor and a source of power, of a thermionic tube containing a filament and plate, the tube being so connected in circuit with the motor as to make the plate positive relative to the filament, primary and secondary coils for controlling the filament circuit, a secondary thermionic tube in circuit with the primary, and a variable resistance for the filament circuit of the secondary thermionic tube.

3. The combination with an electric motor and a source of power, of a thermionic tube containing a filament and plate, the tube being so connected in circuit with the motor as to make the plate positive relative to the filament, primary and secondary coils for controlling the filament circuit, a secondary thermionic tube and a constant speed interrupter in the circuit with the primary coil.

4. The combination with a plurality of electric motors, of a thermionic tube for each motor, and switch means for connecting said motors in series and the respective tubes in series with the motors, or the motors in parallel and a tube in series with each motor, and means for maintaining the temperature of the filament constant.

5. The combination with a plurality of electric motors, of a thermionic tube for each motor, and switch means for connecting said motors in series and the respective tubes in series with the motors, or the motors in parallel and a tube in series with each motor, and means for regulating the temperature of the filaments of the tubes independently of the speed of the motors for maintaining the temperature of the filaments substantially constant.

6. The combination with a plurality of electric motors, of a thermionic tube for each motor, and switch means for connecting said motors in series, and the respective tubes in series with the motors, or the motors in parallel and a tube in series with each motor, and means for maintaining the temperature of the tube filaments substantially constant.

7. The combination of an electric motor and a current supply for said motor, a thermionic tube for controlling said current supply to the motor, a secondary thermionic tube for controlling the temperature of the filament of the motor control tube.

8. The combination of an electric motor and a source of power arranged in series with the motor to supply current thereto, a thermionic tube for controlling the current to said motor, the energy for heating the filament of said tube being derived from said source of power.

In testimony whereof I have hereunto set my hand.

THOMAS F. BURKE.